United States Patent [19]

Soileau

[11] 4,012,663
[45] Mar. 15, 1977

[54] LIGHTING CONTROL SYSTEM

[75] Inventor: Trasimond A. Soileau, Flat Rock, N.C.

[73] Assignee: General Electric Company, New York, N.Y.

[22] Filed: Nov. 25, 1974

[21] Appl. No.: 526,860

[52] U.S. Cl. .............................. 315/151; 250/210; 315/DIG. 5; 315/155

[51] Int. Cl.² ........................................ H05B 37/00

[58] Field of Search .......... 250/210; 315/149, 155, 315/DIG. 5, 151

[56] References Cited
UNITED STATES PATENTS

| | | | |
|---|---|---|---|
| 3,248,549 | 4/1966 | Sanabria | 250/10 |
| 3,431,427 | 3/1969 | Pahl, Jr. | 315/151 X |
| 3,700,960 | 10/1972 | Lake | 315/155 |

*Primary Examiner*—Rudolph V. Rolinec
*Assistant Examiner*—Lawrence J. Dahl
*Attorney, Agent, or Firm*—Sidney Greenberg

[57] ABSTRACT

Spectral output of lamp is controlled by a combination of color filters and dual photocell which monitors the spectral composition of the radiant energy from the lamp and compensates for change therein by automatically varying the power applied to the lamp to provide constant spectral output.

5 Claims, 4 Drawing Figures

LIGHTING CONTROL SYSTEM

The present invention relates to lighting systems and particularly concerns a device for maintaining constant the spectral output of a lamp, such as a high intensity gaseous discharge lamp.

It is an object of the invention to provide an improved device for controlling the illumination characteristics of a lamp, especially of high intensity gaseous discharge type.

It is a particular object of the invention to provide a lamp control device of the above type for controlling the spectral output of the lamp.

Still another object of the invention is to provide an operating and control circuit for lamps which automatically varies the power applied to the lamp to compensate for changes in spectral output of the lamp.

Another object of the invention is to provide a lamp control device of the above type which incorporates a single photocell for monitoring the lamp output.

Other objects and advantages will become apparent from the following description and the appended claims.

With the above objects in view, the present invention in one of its aspects relates to a lighting control device comprising, in combination, a source of electrical power, lamp means connected to the electrical power source for operation thereby, power control means connected between the electrical power source and the lamp means, the lamp means being subject to variation in the spectral composition of its illumination output, and illumination control means for compensating for the spectral variation comprising a photocell exposed to the illumination from the lamp means and having an electrical characteristic which varies in response to varying intensity of the light incident thereon, first and second color filter means respectively arranged between the lamp means and different portions of the photocell, and being respectively transparent to different spectra of the illumination from the lamp means, the different portions of the photocell varying in the electrical characteristic relative to one another upon variation of the intensity of the spectra incident respectively thereon, and circuit means connected to the photocell and the power control means and responsive to the variations in the photocell characteristic for actuating the power control means to vary the power applied to the lamp means for maintaining the spectral output thereon substantially constant.

In a preferred embodiment, the aforementioned circuit means comprises a voltage divider bridge network including the two photocell portions and a pair of resistors of predetermined value, wherein any relative resistance change in the photocell portions is transmitted by means of the bridge network to the power control means for correspondingly varying the power applied to the lamp means.

The invention will be better understood from the following description taken in conjunction with the accompanying drawing, in which.

Figure 1:
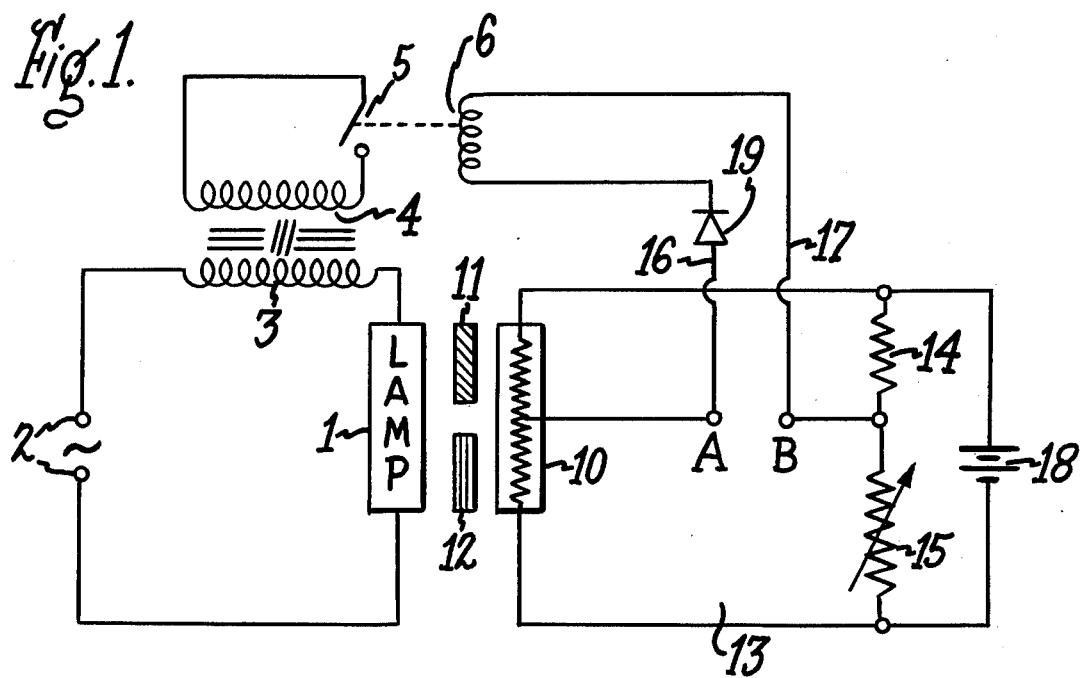
FIG. 1 is a circuit diagram illustrating an embodiment of the invention utilizing relay switch means.

Referring now to the drawing, and particularly to FIG. 1, there is shown a circuit diagram of an embodiment of the lighting control device of the invention including lamp 1 connected to terminals 2 of an alternating current supply and a ballast reactor in the form of induction coil 3 connected in series between lamp 1 and terminals 2. Lamp 1 is typically a high intensity gaseous discharge lamp, such as a known type incorporating a plurality of metal halide vapors. The power applied to lamp 1, and hence its brightness, may be varied by means of a control winding 4 having a switch 5 of any suitable type connected in series therewith. When it is desired to increase the power applied to lamp 1, switch 5 is closed, such as by relay coil 6 which is actuated as more fully described below, thereby providing for flow of current, induced in control winding 4 by the current in main ballast winding 3, through the control winding circuit. This causes increased current to flow in the main winding circuit, resulting in higher wattage being applied to lamp 1. The structure and operation of such a lamp control device is disclosed more fully in co-pending application Ser. No. 407,455 filed Oct. 18, 1973 in the name of C. A. Willis, Jr., Pat. No. 3,873,910 issued Mar. 25, 1975, and assigned to the same assignee as the present invention, and the disclosure thereof is accordingly incorporated herein by reference.

It has been found that the spectral composition of illumination produced by lamps of the aforementioned and other types is sensitive to lamp wattage and may change due to various conditions, such as aging of the lamp or the ambient temperature of the lamp environment, or for other reasons, or the lamp as manufactured may produce light of undesired color due to manufacture variables or due to insufficient power applied to the lamp in the particular installation. In accordance with the invention, the spectral output of the lamp is continuously monitored by a photoelectric color sensing apparatus as more fully described below which detects variations in such spectral output and operates to vary the power applied to the lamp for maintaining a spectral output of the desired nature, e.g., to maintain the lamp illumination at a desired white condition.

For this purpose, there is provided in the FIG. 1 embodiment a color sensor device comprising photoelectric cell 10 such as cadmium sulfide photoconductive cell arranged with its photosensitive surface exposed to the illumination from lamp 1, and a pair of color filters 11 and 12 placed between lamp 1 and different portions, e.g., different halves, of photocell 10 as shown. Filter 11 in the illustrated arrangement is a green filter which would transmit radiation of the shorter wave lengths, e.g., green and blue light, to the photocell, whereas filter 12 is a red filter which would transmit radiation of the longer wave lengths, e.g., orange, red and yellow light, to the photocell. Photocell 10 forms one leg of a bridge network 13 and series connected resistors 14 and 15 form the other leg of the bridge, with output terminal A connected to the junction of the two halves of photoconductor 10 and output terminal B connected to the junction of resistor 14 and resistor 15, the latter preferably being a variable resistor as shown. A voltage source such as battery 18, or other appropriate unidirectional power source, or an alternating current source in conjunction with a rectifier means, is connected to opposite junctions of the bridge legs as shown. Leads 16 and 17 connect sensor terminals A and B respectively to opposite sides of relay coil 6, with diode 19 arranged in series with terminal A as shown. Diode 19 serves to provide stability to the system to prevent positive feedback, as will be understood by those versed in the art. Switch 5 in the circuit shown may be the normally open contacts of relay coil 6 which are closed upon energization of the relay.

In the operation of the described system, bridge network 13 is preferably initially adjusted, e.g., by adjusting variable resistor 15, so that the potential at terminal A is slightly greater than at B, since lamp 1 typically has a blue tinge in its initial operation due to insufficient wattage applied thereto to produce entirely white light. Under these conditions, relay 6 is energized and closes switch 5 so that current flows in ballast control winding 4, producing a corresponding increase in power applied to lamp 1 as previously explained. As a result, the lamp color is shifted toward red or the longer wave lengths and the lamp produces an improved white light, at which time the potential at terminal A drops to a point where relay contacts 5 open and no supplementary power is applied to the lamp via control winding 4. As the color shifts toward blue or the shorter wave lengths due to the drop in lamp wattage, the described process is repeated, so that the desired white light is maintained.

When, due to aging of the lamp or other causes, the spectral output of lamp 1 changes so that, for example, the amount of red light emanating from the lamp decreases, the intensity of the light passing through red filter 12 and incident on the lower half of photocell 10 decreases, causing increased resistance in the latter portion of photocell 10 and producing a higher potential at terminal A relative to that at terminal B. As a result, a corresponding increase in power is applied to lamp 1 as previously explained to restore the desired white light of the lamp illumination. Since the white light contains an increased red light component, a higher intensity of light is incident on the lower portion of photocell 10, dropping its resistance and correspondingly reducing the potential at terminal A, thereby reducing the power applied to the lamp.

As will be understood, if the positions of green filter 11 and red filter 12 are interchanged, it would be necessary to place diode 19 in series with terminal B and adjust the bridge network initially so that the potential at terminal B is somewhat higher than at terminal A.

The type of filters used may differ from those described, depending on the type of lamp employed as well as on the nature of the photocell used, since different types of lamps may have different spectral characteristics and different photocells may be sensitive to different spectral regions. Hence, while the filters described above are referred to specifically as red and green filters, it will be understood that in general the respective filters will be such that they transmit light rays in different spectral bands or ranges, depending on the lamp and photocell used. As used herein, the expression characterizing the filters as "transparent to different spectra" means that the filters transmit light in predominantly different bands or regions of the spectrum.

In the case when lamp 1 is an incandescent lamp, it has been found that because such a lamp emanates more blue light with increased wattage, in contrast to the above described lamp having plural halide vapors which emanates more red light with increased power, the described arrangement of red and green filters would be reversed, i.e., their positions would be interchanged, in order to provide and maintain the desired white light from the incandescent lamp by operation of the described sensing apparatus.

Instead of being a photoconductive cadmium sulfide cell, photocell 10 may be a photovoltaic type such as selenium cell. In that case, the separate voltage source 18 may be dispensed with, since the selenium cell would generate the necessary voltage itself. Also, the selenium cell operates such that a reduction in the intensity of light incident thereon causes a reduction in its voltage output. Hence, the use of a selenium cell in the illustrated circuit would result in a reverse effect from that obtained when a photoconductive cell is used, and accordingly, the positions of the red and green filters would be interchanged from the positions shown in FIG. 1.

Figure 2:
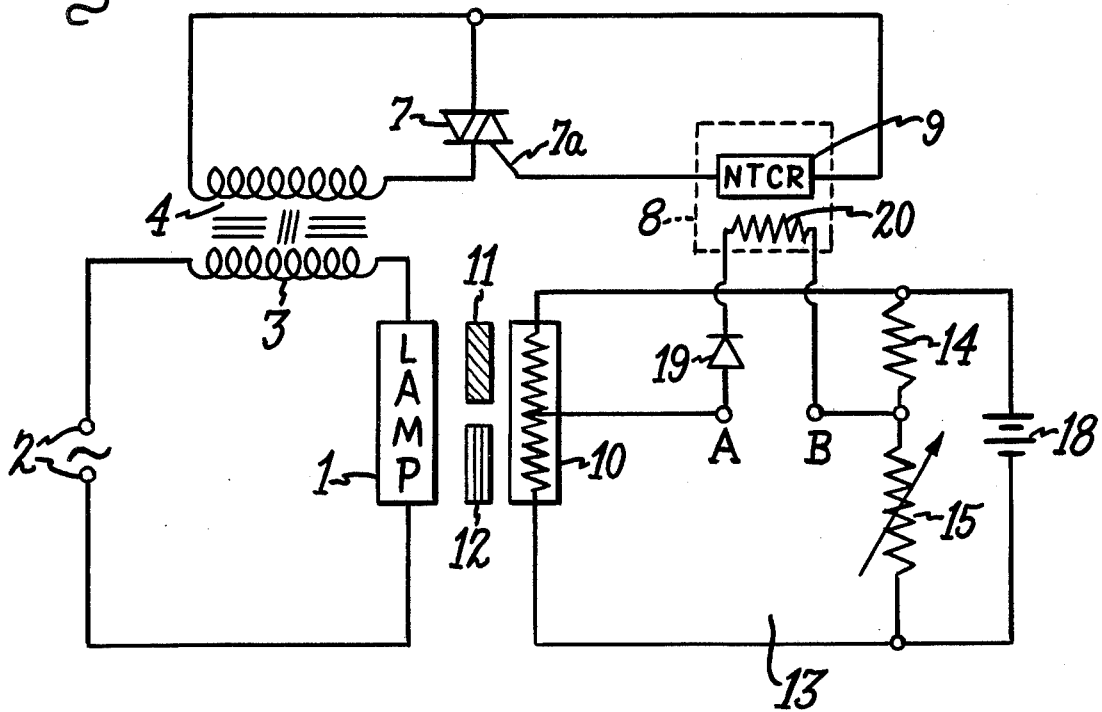
FIG. 2 shows a different embodiment of the invention utilizing a thermo-coupler device for actuating an electronic switch.

FIG. 2 shows a modified form of the described lighting control device wherein triac 7 is used as a switch in series with control winding 4. Operation of triac 7 is triggered when current applied to its gate electrode 7a reaches a predetermined level. Current applied to the triac gate is controlled in the illustrated embodiment by a thermo-coupler device 8 comprising negative temperature coefficient resistor (NTCR) 9 connected to triac gate electrode 7a and heating resistor 20 connected in series with terminals A and B of color sensor device 13. As shown by the interrupted lines, NTCR 9 and heating resistor 20 are thermally coupled together, so that increased temperature of resistor 20 resulting from higher potential at terminal A lowers the resistance of NTCR 9. The lower the latter's resistance, the earlier in the a-c cycle the triac 7 will fire. Hence, this system provides for correction of power to lamp 1 in relatively small increments, as compared to the arrangement shown in FIG. 1.

Figure 2A:
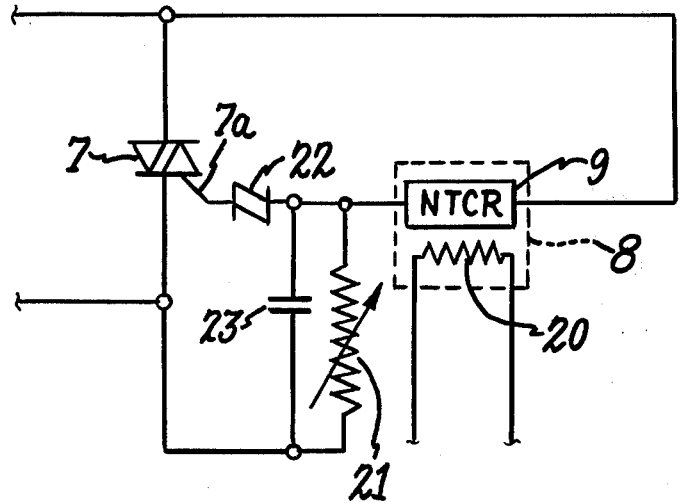
FIG. 2a shows a modified form of trigger circuit for the FIG. 2 electronic switch.

FIG. 2a shows a modified trigger circuit which provides for improved reliability in triggering the operation of triac 7 shown in the FIG. 2 circuit. The firing of triac 7 is controlled in this embodiment by a circuit comprising NTC resistor 9 and adjustable resistor 21 connected in series across triac 7, with a voltage sensitive triggering device 22 such as a silicon bilateral switch (SBS) connected to the junction of NTCR 9 and resistor 21, and capacitor 23 connected across resistor 21, so that triac 7, its gate electrode 7a, SBS 22 and capacitor 23 form a series discharge loop. This circuit provides for proper phase control of the triac firing so that the triac is turned on at the optimum time in the alternating current cycle.

Figure 3:
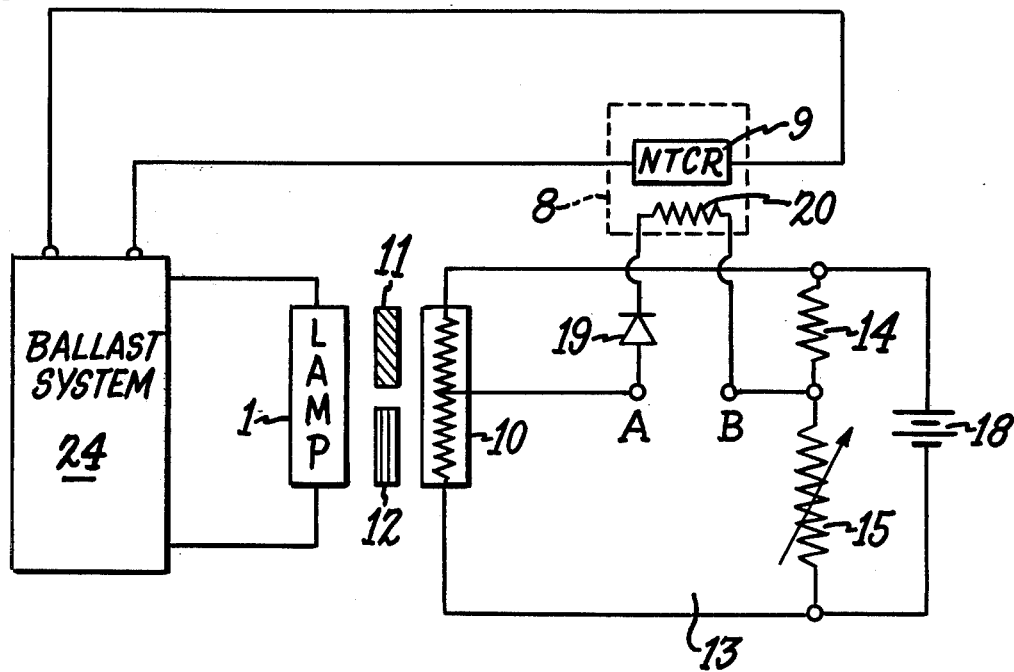
FIG. 3 shows another embodiment of the invention utilizing a thermo-coupler device for controlling the operation of a different ballast system.

A further modification of the control device is shown in FIG. 3, wherein NTCR 9 of the thermo-coupler device shown in FIG. 2 is connected to a lamp ballast system 24 of suitable type which utilizes a variable resistor to change lamp power. Such a ballast arrangement is shown for example in Nuckolls U.S. Pat. No. 3,629,683 and the disclosure thereof is accordingly incorporated by reference herein. As will be evident, NTCR 9 may be connected in series with, or in place of, the variable resistor 10 as shown, for example, in FIG. 1 of the Nuckolls patent, and in such an arrangement the ballast shown in the patent, operating in conjunction with the sensing network of the present invention as indicated in FIG. 3, will control the color of lamp 1.

Various types of ballasts other than those shown may alternatively be employed with the color sensing device of the invention.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Lighting control device comprising, in combination, a source of electrical power, gaseous discharge lamp means connected to said electrical power source for operation thereby, power control means comprising electrical ballast means connected between said electrical power source and said lamp means, said lamp means being subject to variation in the spectral composition of its illumination output, and illumination control means for compensating for said spectral variation, comprising a photocell exposed to the illumination from said lamp means and having an electrical characteristic which varies in response to the varying intensity of the light incident thereon, first and second color filter means respectively arranged between said lamp means and different portions of said photocell, and being respectively transparent to different spectra of the illumination from said lamp means, said different portions of said photocell varying in said electrical characteristic relative to one another upon variation of the intensity of the spectra incident respectively thereon, and circuit means connected to said photocell and said power control means and responsive to the variations in said photocell electrical characteristics for actuating said power control means to vary the power applied to said lamp means for maintaining the spectral output thereof substantially constant, said lamp means comprising a high intensity gaseous discharge lamp means incorporating a plurality of metal vapors, one of said color filter means transmitting the longer wave lengths of visible light and other color filter means transmitting the shorter wave lengths of visible light, said electrical ballast means comprising a first induction coil connected to said electrical power source and said lamp means, a second induction coil inductively coupled to said first induction coil, switch means connected in series with said second induction coil, and actuating means connected to said illuminating control means for operating said switch means.

2. A device as defined in claim 1, said actuating means comprising a relay coil.

3. A device as defined in claim 1, said switch means comprising a controlled semiconductor switch having a control electrode, said actuating means comprising variable rsistance means connected to said control electrode and responsive to the operation of said illumination control means for actuating said semiconductor switch.

4. A device as defined in claim 3, wherein said variable resistance means comprises co-acting heating resistor means and negative temperature coefficient resistor means.

5. Lighting control device comprising, in combination, a source of electrical power, gaseous discharge lamp means connected to said electrical power source for operation thereby, power control means comprising electrical ballast means connected between said electrical power source and said lamp means, said lamp means being subject to variation in the spectral composition of its illumination output, and illumination control means for compensating for said spectral variation, comprising a photocell exposed to the illumination from said lamp means and having an electrical characteristic which varies in response to the varying intensity of the light incident thereon, first and second color filter means respectively arranged between said lamp means and different portions of said photocell, and being respectively transparent to different spectra of the illumination from said lamp means, said different portions of said photocell varying in said electrical characteristic relative to one another upon variation of the intensity of the spectra incident respectively thereon, and circuit means connected to said photocell and said power control means and responsive to the variations in said photocell electrical characteristic for actuating said power control means to vary the power applied to said lamp means for maintaining the spectral output thereof substantially constant, said lamp means comprising a high intensity gaseous discharge lamp means incorporating a plurality of metal vapors, one of said color filter means transmitting the longer wave lengths of visible light and the other color filter means transmitting the shorter wave lengths of visible light, said circuit means comprising variable resistance means connected to said electrical ballast means, said variable resistance means comprising co-acting heating resistor means and negative temperature coefficient resistor means.

* * * * *